(12) United States Patent
Snow

(10) Patent No.: US 6,964,034 B1
(45) Date of Patent: Nov. 8, 2005

(54) APPLICATION DEVELOPMENT SERVER AND A MECHANISM FOR PROVIDING DIFFERENT VIEWS INTO THE SAME CONSTRUCTS WITHIN A STRONGLY ENCAPSULATED ENVIRONMENT

(75) Inventor: Paul Alan Snow, Richland, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,861

(22) Filed: Apr. 20, 2000

(51) Int. Cl.[7] ............................ G06F 9/44; G06F 15/16
(52) U.S. Cl. ...................... 717/121; 717/101; 717/104; 717/171; 709/201
(58) Field of Search .................. 717/101–103, 717/168, 169, 120–123, 162, 174, 175, 104, 717/171; 709/200–253; 707/100, 103 R

(56) References Cited

U.S. PATENT DOCUMENTS

| | | | | |
|---|---|---|---|---|
| 4,809,170 A | * | 2/1989 | Leblang et al. | 717/122 |
| 5,001,628 A | | 3/1991 | Johnson et al. | 364/200 |
| 5,361,360 A | * | 11/1994 | Ishigami et al. | 717/103 |
| 5,423,042 A | * | 6/1995 | Jalili et al. | 709/328 |
| 5,497,484 A | | 3/1996 | Potter et al. | 395/600 |
| 5,548,759 A | * | 8/1996 | Lipe | 707/100 |
| 5,675,802 A | * | 10/1997 | Allen et al. | 717/103 |
| 5,754,857 A | * | 5/1998 | Gadol | 709/203 |
| 5,832,266 A | | 11/1998 | Crow et al. | 395/700 |
| 5,953,525 A | * | 9/1999 | Glaser et al. | 717/105 |
| 6,029,196 A | * | 2/2000 | Lenz | 709/221 |
| 6,083,276 A | * | 7/2000 | Davidson et al. | 717/107 |
| 6,145,119 A | * | 11/2000 | House et al. | 717/101 |
| 6,546,554 B1 | * | 4/2003 | Schmidt et al. | 717/176 |
| 6,640,317 B1 | * | 10/2003 | Snow | 714/38 |
| 6,795,967 B1 | * | 9/2004 | Evans et al. | 719/310 |
| 2004/0205690 A1 | * | 10/2004 | Pieper | 717/100 |
| 2004/0261053 A1 | * | 12/2004 | Dougherty et al. | 717/101 |
| 2005/0055670 A1 | * | 3/2005 | Otto et al. | 717/121 |
| 2005/0071803 A1 | * | 3/2005 | Cherdron et al. | 717/101 |
| 2005/0108684 A1 | * | 5/2005 | Sohn et al. | 717/120 |

OTHER PUBLICATIONS

O. Schettler, "Design Tool Encapsulation—All Problems Solved?", Proceedings of the conference on European design automation, Sep. 1994, pp. 206-211.*

(Continued)

*Primary Examiner*—Tuan Dam
*Assistant Examiner*—J. Derek Rutten
(74) *Attorney, Agent, or Firm*—Duke W. Yee; David A. Mims, Jr.; Lisa L. B. Yociss

(57) ABSTRACT

An application development server for aid in developing software and a system, method, and apparatus for updating continuously the working definitions of an encapsulated application such that different views of a construct may be supported and that changes made in one view of the construct may be reflected in the other views of the construct. In a preferred embodiment of the application development server, the application server includes a processor, a memory unit, a storage unit, and a communications link to a network. The working definition defined environment is stored on the storage unit. The processor executes instructions stored in the memory unit that allow the application development server to receive requests for working definition defined environments from clients, retrieve the working definition defined environment from the storage unit and send the working definition defined environment to the client via the communications link to the network.

19 Claims, 7 Drawing Sheets

OTHER PUBLICATIONS

Jiun-Liang Chen, Feng-Jian Wang, "Encapsulation in object-oriented programs", ACM SIGPLAN Notices, Jul. 1996, vol. 31 Issue 7, pp. 30-32.*

Al Butkus, Barbara L. Mitchell, "A framework for encapsulating card-oriented, interactive, legacy applications", ACM SIGSOFT Software Engineering Notes, Jan. 1998, vol. 23 Issue 1, pp. 44-46.*

Peter R. Sutton, Stephen W. Director, "Framework encapsulations: a new approach to CAD tool interoperability", Proceedings of the 35th annual conference on Design automation conference, May 1998, pp. 134-139.*

Dossick and Kaiser, "CHIME: A Metadata-Based Distributed Software Development Environment", 1999, Springer-Verlag Heidelberg, Lecture Notes in Computer Science, vol. 1687 / 1999, ISSN: 0302-9743.*

Garfinkel and Spafford, "Web Security & Commerce", 1997, O'Reilly, accessed online on Nov. 24, 2004 at <www.oreilly.com/catalog/websec/chapter/ch01.html>, ISBN 1-56592-269-7, Chapter 1.*

David Garlan, Linxi Cai, Robert L. Nord, "A transformational approach to generating application-specific environments", Nov. 1992, ACM SIGSOFT Software Engineering Notes, vol. 17 Issue 5, ISSN:0163-5948, pp.: 68-77.*

* cited by examiner

FIG. 5

```
<requirements>
    <platform>
        <processor>xx86</processor>
        <os>"Windows 95" or "Windows 98" or "Windows NT" </os>
    </platform>
    <services>
        <service>TCP/IP</service>
        <service>File System</service>
    </services>
    <prereqs>
        <application>Acrobat</application>
    </prereqs>
    <registryEntry name="HKEY_CURRENT_USER/Software/X.Com">
        <key>DebugPort<value>TCP/IP Port#</value></key>
        <key>Java VM<value>x<test>x gt "1.1.6"</test></value></key>
    </registryEntry>
    <directory name="programRoot"/>
    <directory name="jclass">programRoot"/jclass"</directory>
    <environmentVar name=path>
        <add>bin</add>
    </environmentVar>
    <environmentVar name=classpath>
        <add>jclass"/jappNetUI.jar"</add>
        <test>programRoot"/testClasspath"</test>
    </environmentVar>
<requirements/>
```

502: platform
504: services
506: prereqs
508: registryEntry
510: directory
512: environmentVar

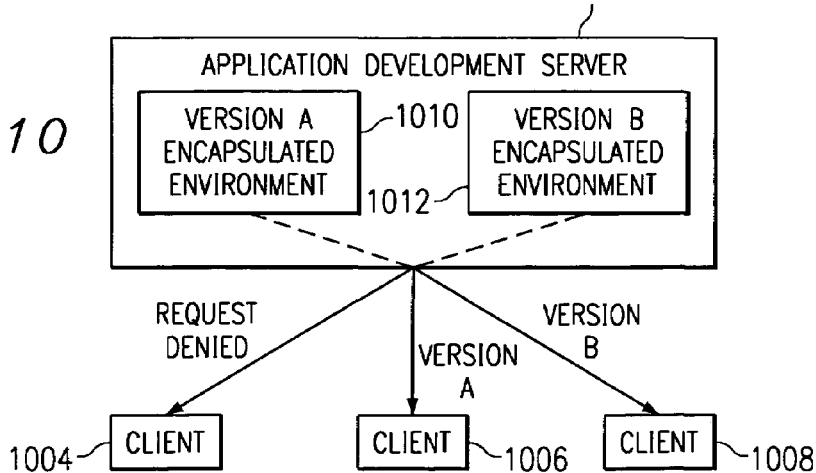

FIG. 10

APPLICATION DEVELOPMENT SERVER AND A MECHANISM FOR PROVIDING DIFFERENT VIEWS INTO THE SAME CONSTRUCTS WITHIN A STRONGLY ENCAPSULATED ENVIRONMENT

CROSS REFERENCE TO RELATED APPLICATIONS

The present application is related to U.S. patent application Ser. No. 09/552,863 currently abandoned, entitled "Strongly Encapsulated Environments for the Development, Deployment, and Management of Complex Application configurations" filed even date herewith, U.S. patent application Ser. No. 09/552,864, currently abandoned, entitled "A Method for Creating Encapsulated Applications with Controlled Separation form an Application's Runtime Representation" filed even date herewith, and to co-pending U.S. patent application Ser. No. 09/552,862, currently allowed, entitled "Mechanism for Automated, Generic Application Damage Detection and Repair in Strongly Encapsulated Applications" filed even date herewith. The content of the above mentioned commonly assigned, co-pending U.S. Patent applications are hereby incorporated herein by reference for all purposes.

BACKGROUND OF THE INVENTION

1. Technical Field

The present invention relates generally to the field of computer software and, more particularly, to a method, system, and apparatus for controlling and distributing software development environments that are fully and correctly configured and tuned to address the various roles developers, test teams, and management, and others play in the process of developing software applications.

2. Description of Related Art

A continual problem with software development is the need to control and distribute environments that are fully and correctly configured. The source code of an application is generally understood to define an application, but a pragmatic view would have to also include in this application definition a host of other software, including the operating system, compilers, tools, directory structures, debuggers, and configuration settings necessary to be effective in developing, compiling, testing, and using the application. When developing large applications, the various roles begin to require different tools, and structures. When development teams are large, these environments, tuned to support each role, must be distributed to all the team members. This process is currently a manual, complex, and error prone effort.

The complexity of managing these environments and the frequently updated application images development requires leads to a steep learning curve as developers must come up to speed with the configurations a given development effort uses, its source tree, state of development, and other structures and procedures. Usually the developer must construct their own development environment using imperfect instructions from a host of sources for each tool used. While this does work, it costs the development effort a significant amount of time, and produces odd effects as differences in environments produce different behaviors which must be identified and understood.

The source code for an application provides an incomplete definition from which the application is built. The missing pieces include the tools, build procedures, and environment configuration for building the application. Most companies today archive not only the source code for applications they develop, but also include every tool, operating system, editor, documentation, debuggers, test data and programs, and other software used in conjunction with development, debugging, testing, and deploying the application. Usually there is an attempt to document the use and mindset behind development and configuration decisions as well. Yet this is an imperfect approach, since the ad hock nature common in software development insures that custom environments used by each developer will be quite different from the environment reconstructed from such an archive.

These problems can be reduced when software developers utilize integrated development environments (IDEs). These environments integrate most of the common and basic tools of software development into one application. This integration reduces the effort required to set up a development environment, insures a standard platform from which the application is developed, and better supports the ability to archive a working development environment. However, for the production of builds and for testing purposes, the use of command line tools such as makefiles and commandline compilers are preferred. This is because integrated development environments do not have a simple, standard interface or mechanism that allows the automated generation of standard builds and revisions. Standard source code control programs also work best when applications are defined by a set of directories and files. Therefore, the usual approach is to export and import source out of and into the IDE to support most of the software development activities that are not strictly related to software development and debugging. Developing and managing the procedures for supporting these different views is inconvenient, and differences in commandline compilers and debuggers and those of the IDE can lead to bugs that are difficult and time consuming to detect and fix.

Software development is also a rather complex process where pieces need to be designed, developed, documented, and tested. As a feature moves through this process, it exists in very different forms. This process may include steps where a feature is proposed, specified, designed, implemented, debugged, tested, folded into the standard build, and included in a released product. At each step, the feature may exist in very different forms, and take the focus of different members of the development team. This is a workflow management problem where the feature under development can be rather fluid, and difficult to understand and define. These difficulties result in development processes that are manual and complex because defining what is required to move a feature from one team member to the next may be different for each feature and for each boundary crossed. Therefore, there is a need to provide a method, system and apparatus that provides a complete definition of an application, the roles supported in this application's development, and definition of the environment required to support each role, and the representation of the application within each role. Developers need an automated process for handing a feature to the test team. All team members need to be able to select a given build, and have delivered the view of that build their job requires. The Build team needs a completely automated facility for producing the versioned build for the quality assurance team. The use of IDEs needs to be supported by automated processes for the development team.

SUMMARY OF THE INVENTION

The present invention provides an application development server for aid in developing software. In a preferred embodiment, the application development server includes a processor, a memory unit, a storage unit, and a communications link to a network. The working definition defined environment is stored on the storage unit. The processor executes instructions stored in the memory unit that allow the application development server to receive requests for working definition defined environments from clients, retrieve the working definition defined environment from the storage unit and send the working definition defined environment to the client via the communications link to the network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a portion of XML code demonstrating one method the requirements part of the working definition may be represented in accordance with a preferred embodiment of the present invention;

FIG. 10 depicts a block diagram illustrating the use of an application development server for providing the ability to build an application in total, with all aspects of building procedure, documentation, and issue tracking covered in accordance with the present invention.

DETAILED DESCRIPTION OF THE PREFERRED EMBODIMENT

Figure 1:
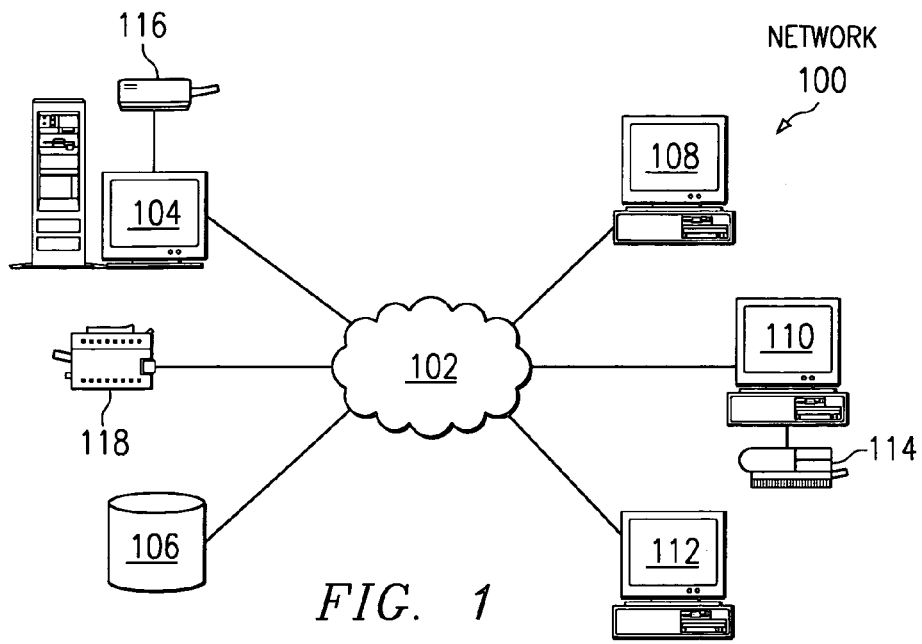
FIG. 1 depicts a pictorial representation of a distributed data processing system which includes the present invention in accordance with the present invention.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
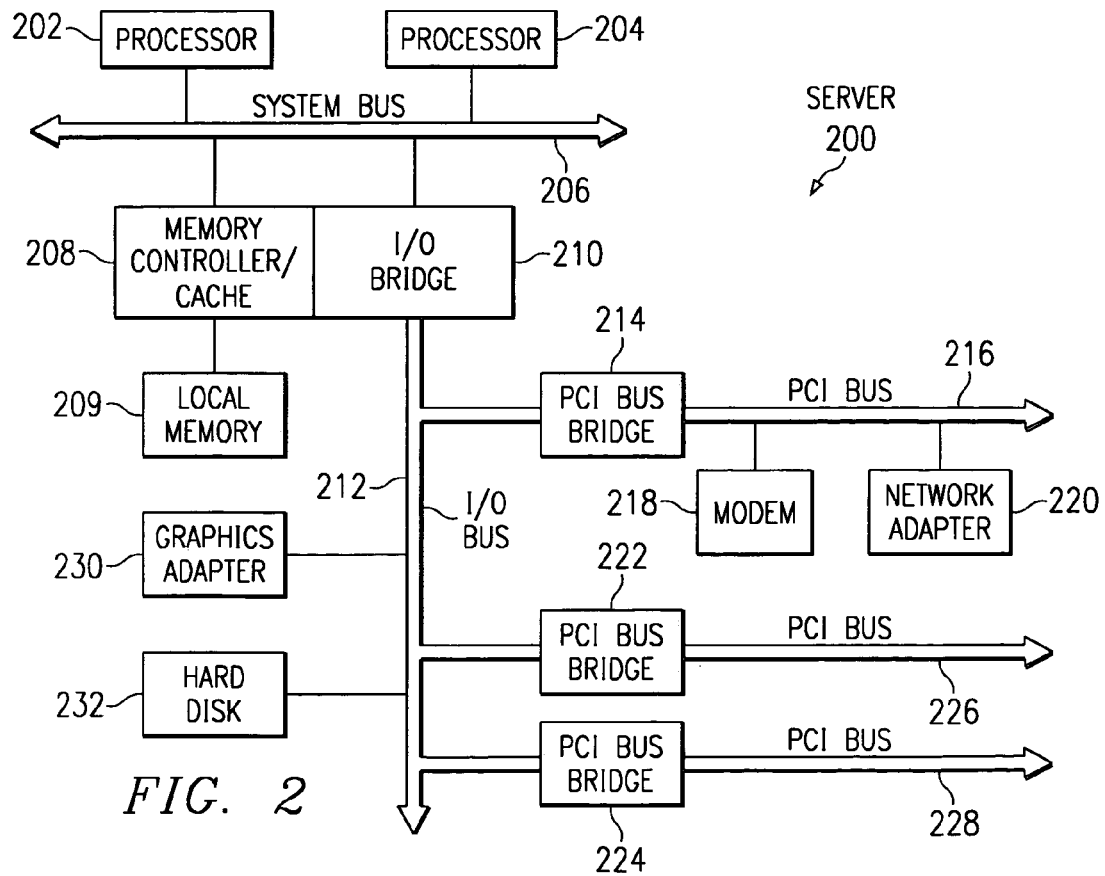
FIG. 2 depicts a block diagram of a data processing system that may be implemented as an application development server which includes the present invention in accordance with the present invention.

Referring to FIG. 2, a block diagram of a data processing system which may be implemented as an application server, such as application development server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
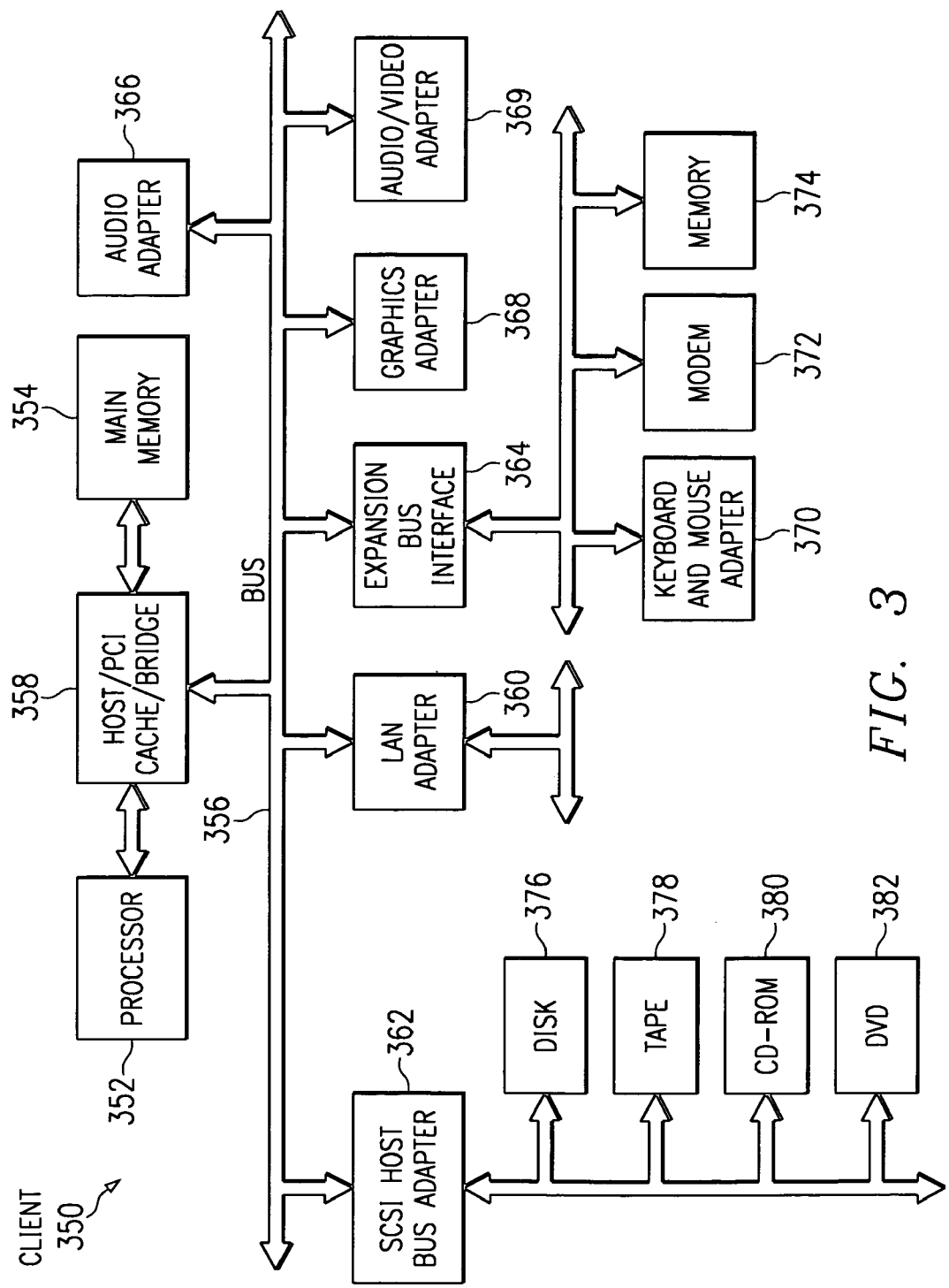
FIG. 3 depicts a block diagram of a data processing system which includes the present invention may be implemented in accordance with the present invention.

With reference now to FIG. 3, a block diagram of a data processing system in which the present invention may be implemented is illustrated. Data processing system 350 is an example of a client computer, such as, for example, one of clients 108–112 in FIG. 1. Data processing system 350 employs a peripheral component interconnect (PCI) local bus architecture. Although the depicted example employs a PCI bus, other bus architectures such as Micro Channel and ISA may be used. Processor 352 and main memory 354 are connected to PCI local bus 356 through PCI Bridge 358. PCI Bridge 358 also may include an integrated memory controller and cache memory for processor 352. Additional connections to PCI local bus 356 may be made through direct component interconnection or through add-in boards. In the depicted example, local area network (LAN) adapter 360, SCSI host bus adapter 362, and expansion bus interface 364 are connected to PCI local bus 356 by direct component connection. In contrast, audio adapter 366, graphics adapter 368, and audio/video adapter (A/V) 369 are connected to PCI local bus 366 by add-in boards inserted into expansion slots. Expansion bus interface 364 provides a connection for a keyboard and mouse adapter 370, modem 372, and additional memory 374. SCSI host bus adapter 362 provides a connection for hard disk drive 376, tape drive 378, and CD-ROM 380 in the depicted example. Typical PCI local bus implementations will support three or four PCI expansion slots or add-in connectors.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to a multiprocessor data processing system.

Figure 4A:
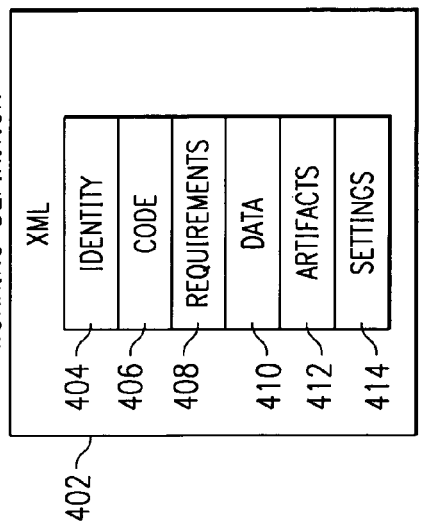
FIG. 4A depicts a block diagram illustrating a data structure for strongly encapsulating an application in accordance with the present invention.

With reference now to FIG. 4A, a block diagram illustrating a data structure for strongly encapsulating an application is depicted in accordance with the present invention. In a preferred embodiment, any software application may consist of the following elements: identity 404, code 406, requirements 408, data 410, artifacts 412, and settings 414. These elements structure the application's defining characteristics. The defining characteristics define the persisted state, settings, and structures required to build a valid runtime representation of the application within its targeted computer system. The application's working definition documents and controls each of these elements of the application.

The application's identity 404 is defined by the application developer, and consists of the application's name, version, etc. The identity section 404 may also provide documentation, web links, etc. for the application useful both to automated management services and users.

The code 406 represents the executable images, files, source code, and any other representation of the executable portion of the application that the application developer may decide to use. The code section 406 may also include executable images, files, source code, etc. to enable the installation, maintenance, configuration, uninstall, etc. of the application through the application's life cycle.

The requirements section 408 defines what directory structures, environment variables, registry settings, and other persisted structures must exist and in what form for this application to be properly constructed and installed in the persisted image of a computer system. The requirements section 408 also details any services and applications that are required to support this application. The requirements section 408 details these concepts as a set of constraints, and also may define the order in which these constraints must be resolved when such order is required. The requirements 408 also define the circumstances and constraints for the use of application specific installation, maintenance, configuration, or uninstall code.

The Data section 410 defines data tables, configuration files, and other persisted structures for the application. The data section 410 is used to hold UI preferences, routing tables, and other information that makes the application more usable.

The Artifacts 412 are the persisted form of the value provided by the application. Examples of Artifacts 412 include documents, spreadsheets, databases, mail folders, text files, image files, web pages, etc. These are the files that contain the user's work ("user" in this context can be human or application).

The settings 414 are the persisted structures created or modified within the runtime representation that are intended to satisfy the requirements for the application. A distinction is drawn between the requirements 408 (which may specify a range of values in a registry setting or the form a directory structure must conform to) and the actual solution constructed in the runtime image 100 to satisfy these requirements.

The Requirements 408 are provided by the developers, application management software, environments, etc. Settings are made in an effort to resolve those requirements, and identify what requirements a setting is intended to satisfy.

Figure 4B:
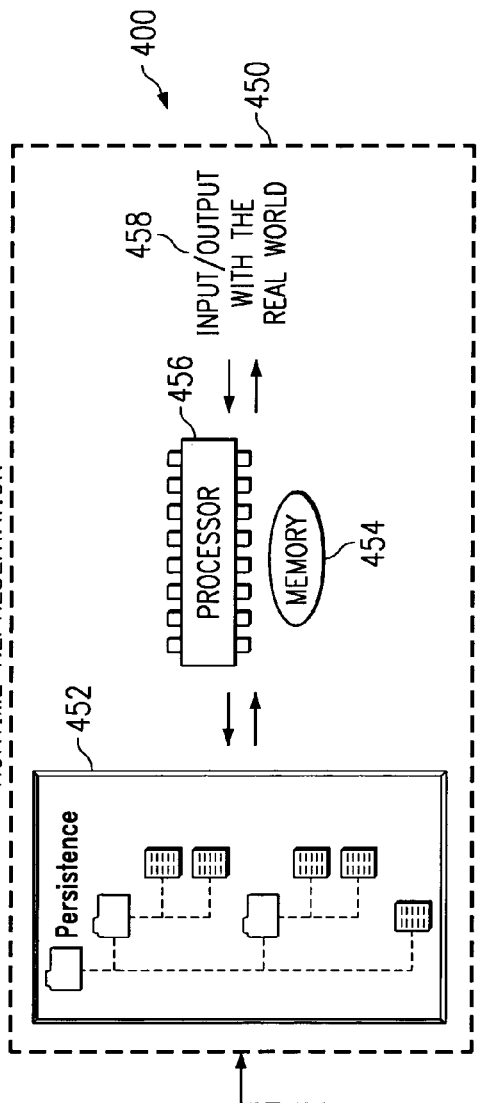
FIG. 4B depicts a block diagram of a new model for a computer architecture in accordance with a preferred embodiment of the present invention.

With reference now to FIG. 4B, a block diagram of a new model for a computer architecture 400 is depicted in accordance with the present invention. The new computer architecture 400 of the present invention builds on the standard architecture.

The core, standard, basic computer architecture is comprised of four elements: one or more processors 456, one or more memory spaces 454, one or more mechanisms for managing input/output 458, and one or more mechanisms for defining persistence 452. The Processor(s) 456 perform(s) the computations and instructions of a given application by loading its initial state into memory from the persisted image for that application.

Persistence 452 is the persisted storage of the applications apart from memory 454. The basic nature of computer systems requires that all applications be stored somewhere. Even if a person types a program into a computer system every time they wish to use that program, the program is always stored somewhere, even if that storage is in someone's head. How an application is stored does not vary much from platform to platform. Applications are stored as, for example, executable files and libraries, files, databases, registry entries, and environment variables. Typically these files, databases, etc. are stored on a physical nonvolatile storage device such as, for example, Read only Memory chips, a hard disk, a tape, CD-ROM, or a DVD. Even in the most complex applications, the number of distinct persisted structures is really rather small, although there can be many of each type.

Regardless of the application's complexity, it depends on its persisted image. If the persisted structure is correct, the application will execute. If the persisted structure is wrong, the application will not execute.

In addition to these traditional computer architecture elements, the new computer architecture 400 also includes an application's working definition 402. In a preferred embodiment, an application's Working definition 402 is an extensible markup language (XML) representation of the identity 404, code 406, requirements 408, data 410, artifacts 412, and settings 414; that is it includes all of the defining characteristics for the application. By defining these elements, separate from the runtime representation 100 of an application, working definitions 402 provides a way to strongly encapsulate an application which is compatible with operating systems that expect applications in an unencapsulated form. Working definitions define a new, universal picture of a computer system. Working definitions do not interfere with any operating system or platform because they have no active behavior. Working definitions define the application's runtime representation 450 by defining what an application is, what it requires, and what was done to give it what it needs, within a given computer system. While working definitions have no active behavior, they enable the implementation of a variety of automated services. These services include application life cycle management, resource tracking, application installation, damage detection and repair, computer system optimization, etc.

Strong encapsulation of state greatly reduces the global complexity of a computer system. States such as, for example, path requirements, file extensions, registry settings, program files, can be maintained in a pure state outside of the runtime representation 450. Because the runtime version of the application 450 is a redundant representation, it can be reconstructed, and fixed using the working definition defined version of the application as the standard. Important modifications can be persisted back to the application's Working Definition as a background task.

Working definitions use XML to define a flexible format for structuring the critical information about an application, thus encapsulating the application. XML provides the ability to extend working definitions to fit future requirements and, XML, just like the hypertext markup language (HTML) of the world wide web, can be as simple or as complex as the job requires. The actual size of a working definition is very small compared to the application it defines, even if the application is just a batch file. At the same time, working definitions can be used to describe vast, distributed, multi-platform applications.

Working definitions are platform and technology independent and address universal configuration issues. Furthermore, working definitions can be used as an open standard. Working definitions provide configuration information to services and to applications as well as providing bookkeeping support.

An application's valid runtime representation is one that satisfies a finite, structured set of constraints. Therefore, XML is an ideal method because XML provides an ideal representation for structured data and supports the ability to define links that allow tracking of internal relationships or for including references to structures defined externally. Furthermore, XML is designed to be easily extended and is platform independent.

However, XML is not a good representation for constant modification and access. The runtime representation for the application provides the application with an efficient executable representation. To provide an application with an efficient executable representation, the XML can detail the required runtime structure and requirements for the application. Using these instructions, the application can be constructed and executed automatically. Prerequisites, in the proper order and with the proper configuration will also be constructed and executed automatically.

As the application executes, changes made to the application's state may be made as they are presently, that is, to the runtime representation. The XML specifies the important files to be persisted, and this persistence may be done in the background. The overhead is thus very minimal with little effect on the performance as viewed from a user's perspective.

The nature of the problem of automating management and configuration of computer systems requires a common, computer friendly and people friendly, complete representation of each software component. Without this information, the automated management of computer systems is not possible.

While the working definitions have been described herein and will be described henceforth with reference to an XML representation of the application, any number of other technologies and approaches might be used as well as will be obvious to one of ordinary skilled in the art. For example, encapsulation could also be implemented using databases or with Zip files. Also, a database could be used for the actual implementation of the support for the encapsulation with XML used as a transfer protocol.

Furthermore, although described primarily with reference to constructing Working Definitions using XML, Working Definitions may be constructed using any structured format. Possible choices, for example, include the use of other structured forms. These include:

Object based technologies (Java Beans, CORBA objects, C++ objects, etc.). These would have to be backed by some sort of database.

Object Oriented databases. These are a mix of databases and Object based technologies.

Functional technologies. One could build a PostScript-like or Lisp-like language (compiled or interpreted) that defines these structures.

Rule based technologies. Since Working Definitions generally resolve sets of constraints, this may well be the best way of implementing services that execution against the constraints that Working Definitions define. Working definitions could be constructed directly into Rule form, similar to forward chainning technologies such as ART, or backward chainning technologies such as Prolog.

Tagged formats. XML is an example of a tagged format. However, there are other tagged formats that would work just as well. Tagged Image Format (TIFF), although generally used for defining images, may also be used to define Working Definitions since the use of custom tags is supported. Additionally, since TIFF is a binary format, it could hold the executable code and binary data. Other tagged formats include SGML, TeX, and LaTex.

In addition to these examples of structured formats, there are certainly other formats and representations that would also work for constructing Working Definitions. Any technology that can 1) represent structured data, 2) support links to outside sources, and 3) can be used across platforms could be used to define Working Definitions.

With reference now to FIG. 5, a portion of XML code is shown, demonstrating one method for representing the requirements element of the working definition, in accordance with a preferred embodiment of the present invention. The portion 500 of XML depicted is only snippet of a representation of the requirements element of the working definition and is given merely as an example. Furthermore, this portion 500 of XML is overly simplified, but does demonstrate how this information might be represented.

Platform tag at 502 reflects the requirement of the application that the platform be an xx86 type of computer, such as, for example, an Intel Pentium® class computer, running a Windows 95™, Windows 98™, or Windows NT™ operating system. Pentium is a registered trademark of Intel Corporation of Santa Clara, Calif. Windows 95™, Windows 98™, and Windows NT™ are all either trademarks or registered trademarks of Microsoft Corporation of Redmond, Wash.

Services tag at 504 indicates that the application requires the TCP/IP and file system services. Prerequisites tag at 506 indicates that the application Adobe Acrobat® is a prerequisite (i.e., requirement) for this application. Adobe Acrobat is a registered trademark of Adobe Systems Incorporated of San Jose, Calif.

The registry tag at 508 describes a registry entry. In this example, a Registry entry and a couple of keys are defined.

The Directory tag at 510 describes a couple of directories, the "programRoot" (which is required, but not specified by name) and a subdirectory "programRoot"/jclass.

Section 512 describes adding the programRoot directory to the path environment variable. The directory "programRoot"/jclass is also described as necessary to be added to the classpath environment variable.

The <test> . . . </test> tags in Section 512 describe tests that can be used to verify the setup of the enclosing section. This is one possible way of describing how to use application specific code to maintain an application.

Thus far, working definitions have been described in terms of strongly encapsulating applications and how it can be used in a computer system made up of applications we simply wish to install and use. However, the reality of computer systems is really much more complicated. Each application within a computer system can be configured properly from its own perspective and still fail to work as a whole. This is because applications are used as building blocks to create integrated environments. All the applications themselves can work fine, but not work together.

Thus, a need exists to define additional constraints on applications above and beyond those of the application alone. For example, a database has its set of requirements and, once installed, is available to support the user and their database applications. A given accounting application may require that certain tables and minimal data sets be create in the database. The typical approach currently is to require that the database be installed prior to the accounting application so that the accounting application can create what it needs during its own installation. Otherwise, the accounting application may document a procedure to create what it needs in the database and require the user to do this themselves.

Thus, in an environment created from a large set of applications, complications of installation order and manual setup procedures can be hugely expensive, error prone and irritating.

On the other hand, the number and size of these constraints are rather trivial from a computer's perspective. The problem, once again, arises from the fact that these constraints are not defined in a standard, maintainable, computer friendly format. However, working definitions provide that standard maintainable, computer friendly and human friendly format.

Figure 6:
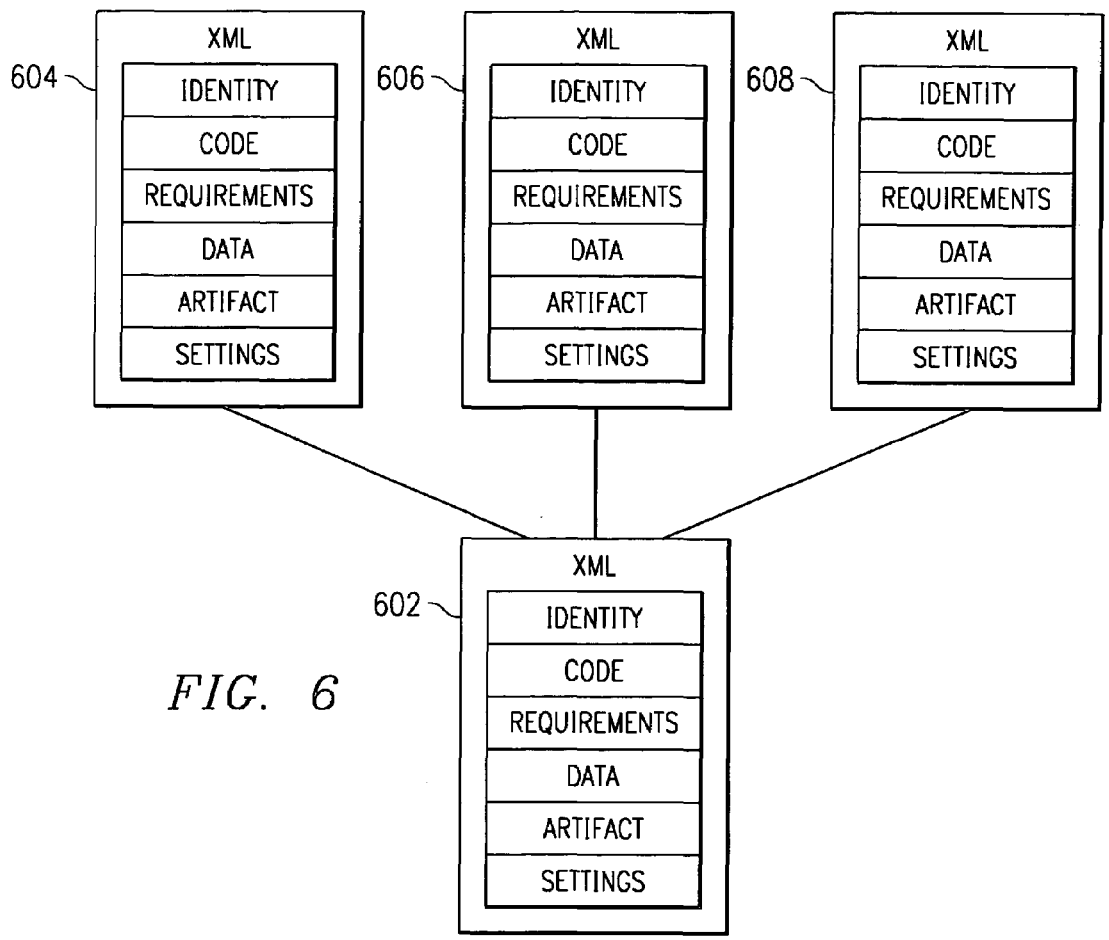
FIG. 6 depicts a block diagram illustrating a manner in which a computing environment may be represented as a set of working definitions for a set of applications and a working definition for the computing environment itself.

Thus, with reference to FIG. 6, a computing environment may be represented as a set of working definitions for a set of applications 604–608 and a working definition for the computing environment itself 602.

The observation to make at this point is that the facilities described update the runtime environment in a manner that satisfies a set of constraints, just as we do manually currently. For example, the database may not, by nature, require a certain directory in an environment variable, such as, for example, the PATH or CLASSPATH. However, in our constructed environment of applications, new constraints are introduced. For example, an accounting application may support several different database applications with differing constraints for each. Settings within the accounting applications may also be determined by the databases, such as, for example, registry settings to database directories. Furthermore, these constraints may vary depending on what features are required by the user.

From a user's perspective, their choices are fairly simple. They want a given database application and a given accounting package to run on a given operating system. The accounting package will be used to perform a given subset of tasks of the many tasks the accounting package might support.

The database and the accounting package are, in this example, independent products. Currently, there is no industry standard method to define the relationship between the database and the accounting package other than via some manual setup routine. If this setup routine has to be repeated, it can lead to significant support and training costs. Under the current system, there is no way of defining and managing these kinds of interactions, such as the interaction between the database and the accounting package.

Figure 7A:
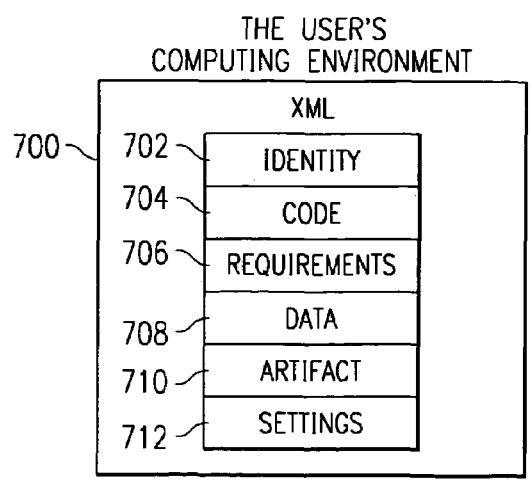
FIG. 7A depicts a block diagram illustrating a data structure for representing a computing environment as a working definition in accordance with the present invention.

With reference now to FIG. 7A, a block diagram illustrating a data structure for representing a computing environment as a working definition is depicted in accordance with the present invention. The computing environment 700 is a structured set of constraints and descriptions, links, files, settings, etc. organized along the basic categories Identity 702, Code 704, Requirements 706, Data 708, Artifacts 710, and Settings 712 in similar fashion to elements 404–414 in FIG. 4 for working definition backed applications. In addition to the definition of elements 404–414 which apply equally to elements 702–712, the Requirements 706 refer to one or more additional Working Definition defined environments or applications, such as, for example, application working definitions 604, 606, and 608 in FIG. 6.

The Working Definition based computing environment 700, in the depicted embodiment, uses an extensible markup language (XML) to define an idealized view of the file system, configuration settings, and state of the data processing system. This definition is translated to a runtime representation in order to execute these applications.

The Working Definition based environment 700 may be replicated, moved, or merged to another platform without requiring the user to reinstall or modify anything. Missing resources can be supplied after the fact, since the Working Definition defined environment 700 defines the construction of the runtime environment through its own settings and those of referenced Working Definition backed applications.

The constraints of an environment, as expressed in the Working Definition 700 through elements 702–712, may allow for conditional expression of applications. This allows the capability of deploying the same environment using different applications that satisfy the environment's requirements. For example, if a word processor is all that is required, MS Word™, Wordperfect®, or Lotus WordPro® might satisfy this requirement on different computer systems for the same environment. Word is a product and trademark of Microsoft Corporation of Redmond, Wash. Wordperfect is a product and a registered trademark of Corel Corporation of Ottawa, Ontario, Canada. Wordpro is a product and a registered trademark of Lotus Development Corporation of Cambridge, Mass.

The constraints of an environment expressed in working definition defined environment 700 also may allow for conditional expression of types of installations of applications. This allows the capability of deploying the same environment using the same applications on different operating systems. For example, if the operating systems supported include the Mac, Windows 95, and Linux, then the appropriate platform versions of each application is installed when the environment is installed on those platforms.

Additionally, the constraints of an environment, as expressed in the working definition for the environment 700, may allow for the conditional expression of the environment's own configuration. For example, a distributed application may require different applications, servers, clients, configuration settings, etc. depending on which machine the environment is installed on. This allows one environment definition to be constructed, managed, preserved, and distributed while expressing itself as appropriate in each computer system taking part in the distributed application.

Since a computing environment may be as simple as a set of unrelated applications (such as set of commandline tools, batch files, directory structures, text files, simple applications, etc.) or as complex as a set of operating systems, distributed programming applications, web servers, CORBA services and programs, compilers, Integrated development environments, Java VMs, and so forth, working definitions of the environment must be as flexible as needed to adequately describe and define the constraints and requirements of the various applications within the computing environment. In the first case, the constraints for the environment may be as simple as a list of applications, path requirements, and a few shortcuts and desktop descriptions. In the second case, the constraints may provide for the construction of directories, files, registry settings, environment variables, and the ordered configuration of each component.

In middleware applications, controlling and assuring the configuration of so many applications is a major problem in developing, testing, and deploying Internet and Web-based solutions. Working Definition based computing environments provide the mechanism to define all these constraints, and allow the "expression" of applications selectively based on the platforms and identities of the computer systems the environment is installed on.

Working Definition based environments provide the ability to define a distributed application as a single environment that can be examined, preserved, configured, managed, and distributed. The results of installing this environment on any one platform depends upon both the environment and the constraints present in that platform and the environment itself.

For example, a middleware application based on Component Broker may require a DB2 database. The DB2 database may be installed on a Unix platform. Component Broker may be installed on a different Unix platform, as well as a Windows NT platform to support development. A distributed environment definition can be constructed many different ways. One method would be as follows.

First DB2 is defined as existing on a particular Unix machine. The configuration of DB2 and other aspects of that Unix machine critical to the middleware application are recorded and managed in the Working Definition based Environment definition. The environment is then installed on the Unix platform slated to support Component Broker. Since this platform is not the DB2 platform (as specified in the requirements of the environment) the installation of DB2 is suppressed. A DB2 client that runs against the DB2 platform is required, however. The DB2 client, Component Broker, the Java VM, and other applications supporting the middleware solution are added to the distributed environment. The expression of these applications is keyed again to the platform. The Environment is then installed on NT. Component Broker is again installed and configured (as required by the NT platform) and configuration issues regarding connections to the DB2 platform and Unix based Component Broker platform are also recorded.

A distributed environment service is able to insure that all platforms retain the same environment description. Yet the configuration that results provides for differing expressions based on platform and role within the distributed application.

The distributed environment definition, based on XML Working Definitions, provides for better support, since Component Broker Specialists and developers can examine the distributed environment to answer questions and address issues that arise as the middleware application is developed and deployed.

Most configuration problems become much more manageable because there is a strict, platform independent definition of exactly what the distributed environment really is. This is possible because all the definition of each application within the distributed environment is modeled as a system of constraints whose expression can be controlled by the system of constraints provided by each computer system.

The observation to make at this point is that the facilities described update the runtime environment in a manner that satisfies a set of constraints, just as we do manually currently. For example, the database may not, by nature, require a certain directory in an environment variable, such as, for example, the PATH or CLASSPATH. However, in our constructed environment of applications, new constraints are introduced. For example, an accounting application may support several different database applications with differing constraints for each. Settings within the accounting applications may also be determined by the databases, such as, for example, registry settings to database directories. Furthermore, these constraints may vary depending on what features are required by the user.

From a user's perspective, their choices are fairly simple. They want a given database application and a given accounting package to run on a given operating system. The accounting package will be used to perform a given subset of tasks of the many tasks the accounting package might support.

The database and the accounting package are, in this example, independent products. Currently, there is no industry standard method to define the relationship between the database and the accounting package other than via some manual setup routine, or custom code. If this setup routine has to be repeated, and the custom code fails to be flexible enough to manage all the configurations within the systems for which it is targeted, the result can lead to significant support and training costs. Under the current system, there is no way of defining and managing generically these kinds of interactions, such as the interaction between the database and the accounting package.

Figure 7B:
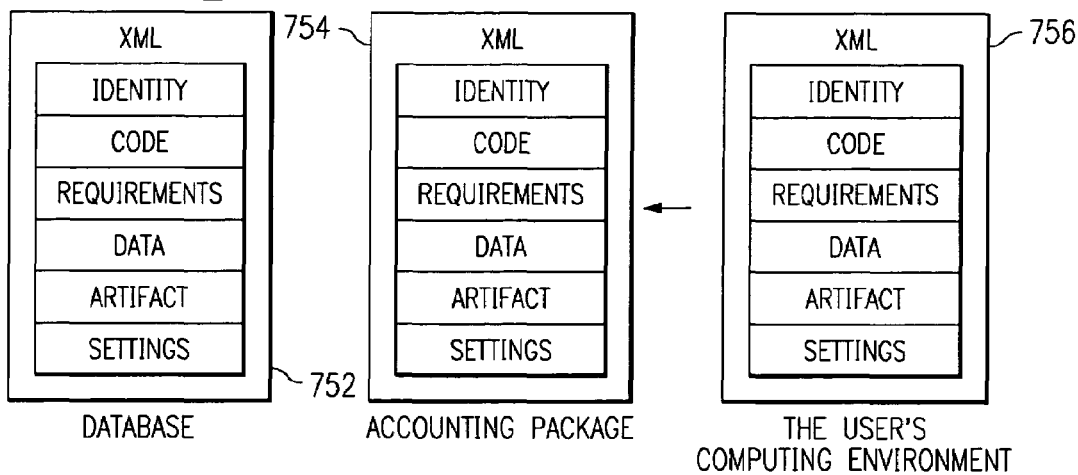
FIG. 7B depicts a block diagram illustrating the relationship between working definition defined software and the working definition defined environment in the context of the database and accounting package example in accordance with the present invention.

With reference now to FIG. 7B, a block diagram illustrating the relationship between Working Definition defined software and the Working Definition defined environment in the context of the database and accounting package example is depicted in accordance with the present invention. Working definitions can be used to define and manage interactions between applications. With a properly constructed set of working definitions 752 and 754 for the two applications (i.e., the database and accounting package) involved, the user's choices become another set of constraints. This set of constraints is the environment working definition 756 (i.e., constraints) that define the user's computing environment. The computing environment specifies that the database and accounting package exist plus the constraints that define the proper runtime image for these applications from the user's perspective.

Although described primarily with reference to managing two applications, the present invention may, of course, be applied to a data processing system having many more than two applications which need to be coordinated to work together properly. Furthermore, the present invention, as illustrated in FIG. 7B, has been described primarily with reference to accounting software, however, it will be obvious that the present invention is not limited to managing accounting software, but may manage any type of software written from operation and execution on a data processing system, such as, for example, word processors, e-mail programs, web browsers, and graphics programs.

Figure 8:
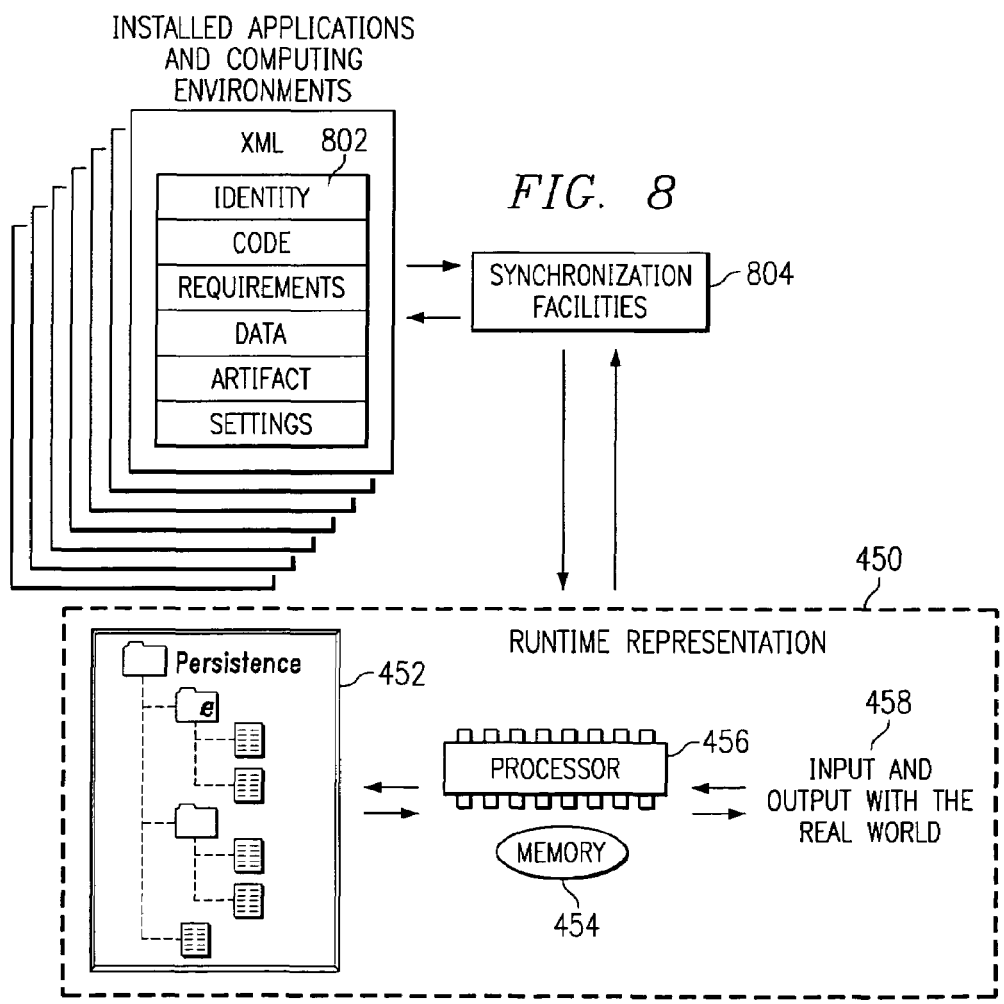
FIG. 8 depicts a block diagram illustrating a configuration facility that monitors the data processing system and continuously updates the working definitions of the environment and applications in accordance with the present invention.

With reference now to FIG. 8, a block diagram illustrating a synchronization facility that monitors the data processing system and continuously updates the working definitions of the environment and applications is depicted in accordance with the present invention. The synchronization facility 804 monitors the data processing system for modifications to the application under development. As modifications to the application are discovered, synchronization facility 804 translates these changes into each view of the application on the current system. Thus, this synchronization facility 804 provides different views and representations of the same structures, such as source code, scripts, documents, and the like.

For example, in the context of software application development, there are typically many individuals involved in writing the source code, the developers, as well as other individuals involved in the build of the application who take all the comments and modifications of all the developers and integrate it into a cohesive unified software product. In addition to these groups of people, there are also individuals who construct test versions of the software application to ensure that it executes as intended. Integrated Development Environments (IDE) are very productive for the software developers (those individuals involved in writing the software code). However, for the production of builds and for testing purposes, the use of command line tools such as makefiles and command line compilers are preferred. However, the IDE and the command line tools are often incompatible. The IDE is provided one view of the application definition while the command line tools are provided with another view of the application definition.

With the present invention, changes made to the application definition in one view are detected by the synchronization facility 804 and reflected in the working definition defined view of the computer environments and applications. Thus, available to the other views of the application definition.

As another example, consider multiple users working with a document on a word processor. Perhaps, one user uses WordPerfect on an Apple Macintosh computer while another user uses Microsoft Word on a Windows based computer for editing the document. The synchronization facility 804 constantly monitors the changes made to the document made by each user and updates the working definition of the encapsulated document appropriately. When the other use receives the document, that user is able to view and edit the document using the other word processor without relying on an individual vendor to support the data format of the other word processor. This is because, the encapsulated document as represented by the documents' working definitions describes everything that defines that document, including fonts, text, and processes for translating it between representations suitable for different word processors.

Figure 9:
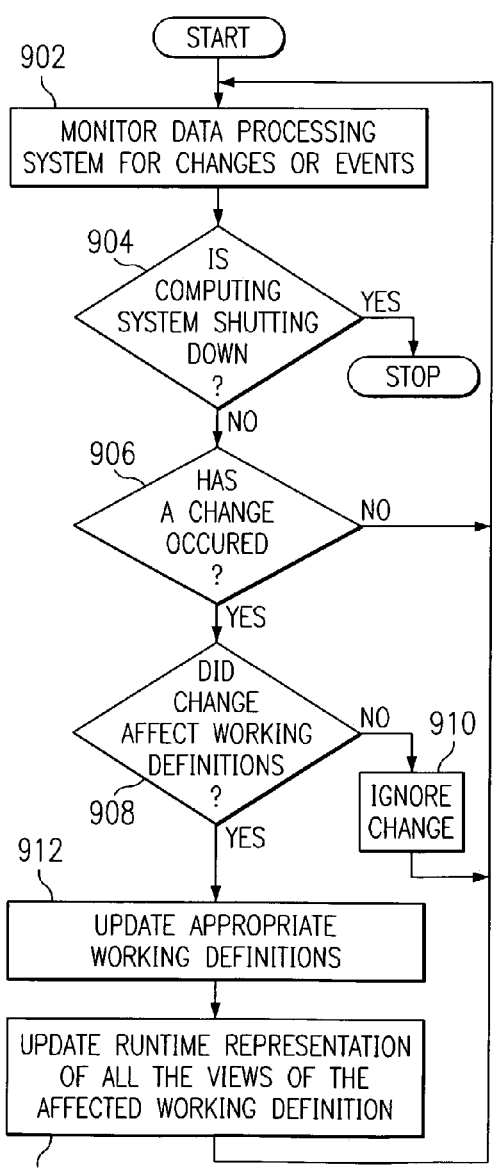
FIG. 9 depicts a flowchart illustrating a method of continuously updating the working definitions of the environment and applications within a data processing system such that different view into the same constructs may be obtained in accordance with a preferred embodiment of the present invention.

With reference now to FIG. 9, a flowchart illustrating a method of continuously updating the working definitions of the environment and applications within a data processing system such that different view into the same constructs may be obtained is depicted in accordance with a preferred embodiment of the present invention. To start, the synchronization facility, such as, for example, synchronization facility 804 in FIG. 8, monitors the data processing system for changes (step 902) and first determines whether an indication the computer system is shutting down has occurred (step 904). If it is, then the process stops. If an indication that the computer system is shutting down is not received, then the synchronization facility determines if any changes have occurred (step 906). If no event has occurred, then the synchronization facility continues to monitor the data processing system for changes (step 902).

If a change has occurred within the data processing system, then the configuration facility determines whether the event will have an affect on any of the working definitions of any of the installed applications or the working definition of any of the computing environments (step 908). If the change did not affect any of the working definitions, then the configuration facility ignores the change (step 910) and continues monitoring the system for changes (step 902).

If the change did effect the working definitions of an application or computing environment, then the appropriate one or ones of the working definitions are updated by the configuration facility to reflect the change (step 912). Once the working definitions have been updated to reflect the changes indicated by the detected change, the configuration facility updates the runtime representation of the views of the working definitions effected by the change (step 914). Once the runtime images have been updated, the synchronization facility continues monitoring the data processing system for new changes (step 902).

The change may be an active event, such as, for example, a change to a file, such as a document used on a word processor or a source code file, or may be some passive change to the data processing system. Thus, the effect of the change on the file is updated in the working definitions for that file and when a different application accesses that file that utilizes a different view of the data, a correct runtime version of the file may be generated from the working definition for that file.

With reference now to FIG. 10, a block diagram illustrating the use of an application development server for providing the ability to build an application in total, with all aspects of building procedure, documentation, and issue tracking covered is depicted in accordance with the present invention. The application development server 1002 may be implemented as server 200 illustrated in FIG. 2A and may be integrated into a network of computers such as, for example, server 104 connected to network 102 in FIG. 1. The application development server 1002 is connected to a plurality of clients 1004–1008 via this network, which is not shown for ease of illustration.

Another continuing problem with software development in the prior art is the need to control and distribute environments that are fully and correctly configured. Furthermore, as the development of the software continued, changes to these environments also had to be distributed.

Currently, in the prior art, this is a manual and error prone effort. Each software development effort comes with its own learning curve as developers come up to speed with the configurations required, source tree, state of development, etc. Usually, the developer must construct their own development environment using imperfect instructions from a host of sources for each tool used. While this does work, it costs the development effort a significant amount of time, and produces odd effects as differences in environments produce different behaviors.

The source code for an application provides an incomplete definition from which the application is built. The missing pieces include the tools, build procedures, and environment configuration for building the application. The application development server 1002 provides the ability to build the application in total, with all aspects of building, procedure, documentation, and issue tracking covered.

Strong encapsulated environment technology, as defined by working definitions as discussed above, allows the application development server 1002 to deliver fully configured environments 1010, configured to the requirements of the task (e.g., management, testing, development, etc.) on demand to each of several clients 1004, 1006, and 1008. Of course, there may be many more clients than illustrated herein.

Thus, the application development server 1002 provides a single point of contact for everything required for application development, including, for example, the necessary tools, configuration settings, and source code. This ability is provided using the working definition defined environments 1010 and 1012 as defined by working definitions that is discussed above. The application development server 1002 provides web access that allows authenticated users to download and use a fully configured environment at a click of a link. The separation of environment and the runtime representation of that environment inherent with working definition defined environments allow the delivery of an environment, such as, for example, one of environments 1010 and 1012, in this fashion.

The delivery of each environment 1010–1012 is added by its ability to make use of local facilities where those facilities match the environment's requirements. Because each environment 1010–1012 is completely pre-configured, all applications can be fully setup, automated, and documented through the application development server 1002. If, the application development server 1002 is available through the Internet, rather than a private intranet, encrypted links may be shipped with the environment to provide support during development, testing, beta testing, and deployment of the application. Any number of encryption methods, such as, for example, RSA or elliptic curve cryptography, may be utilized. Such methods of encryption, as well as other methods, are well known in the art and will not be further discussed herein.

The application development server 1002 may also keep records of development team members, possibly through the use of IDs. This information may be correlated with the roles each team member plays in the development of the application. Thus, each member may be assigned certain privileges such that only certain versions of the runtime environment are available to that member depending on the needs of that member in performing the tasks of that team members respective role or roles.

Thus, as depicted in FIG. 10, three clients have requested versions of the runtime images 1010–1012. Suppose that clients 1004–1006 have requested version A 1010 and that client 1008 has requested version B 1012. The application development server 1002 determines what privileges each requesting client has. In the depicted example, the application server 1002 has determined that client 1006 has privileges to access version A 1010 and has accordingly sent version A 1010 to client 1006. The application development server has also determined that client 1008 is entitled to version B 1012 and has accordingly sent version b 1012 to client 1008. However, the application server 1002 has determined that client 1004 is not entitled to version A 1010 as requested and has thus sent a message to client 1004 that the request is denied.

Client 1004 may have been denied, for example, because client 1004 is entitled to receive only version B 1012 or because client 1004 has no privileges to receive any of the versions 1010–1012 of the runtime environment. Thus, each of clients 1006–1008 receives the runtime environment necessary to perform the task assigned to that client and the client 1004 which did not have appropriate privileges has been denied, thus preserving the security of the application as it is developed.

Those of ordinary skill in the art will appreciate the fact that while FIG. 10 describes how the security can enforce the roles assumed by various clients, the same sorts of mechanisms can be used to distribute roles without qualification, to distribute roles based off the clients identity, or to strictly define a set of clients that are to play very particular roles within, for example, a workflow management, distributed computing, or parallel processing scenarios.

The application development server defines all of the roles in a development process. The application development server may also define the particular roles that team members perform. Furthermore, the application development server centralizes the definition and distribution of roles in a development process. Because any software application can be distributed this way and its state defined through its persistence, the application development server can be used to distribute computing environments to support any work flow application. For example, the application development server may define the role of an application developer, manager, and tester. However, it may also support a manufacturing assembly line workflow process where data processing systems are used to operate a variety of automated machines and tools.

Thus, although described with reference to managing software development, any form of work, including, for example, artwork, documents, web pages, spread sheets, and data bases, manufacturing, that is created through a process using multiple users and computer systems with multiple roles requiring a variety of configurations and environment settings may be configured and managed with the application development server.

Those skill in the art will also appreciate the fact that the representation provided to the clients may be through conventional data bases, web pages, Java servers, or any other distributed server interface.

Figure 11:
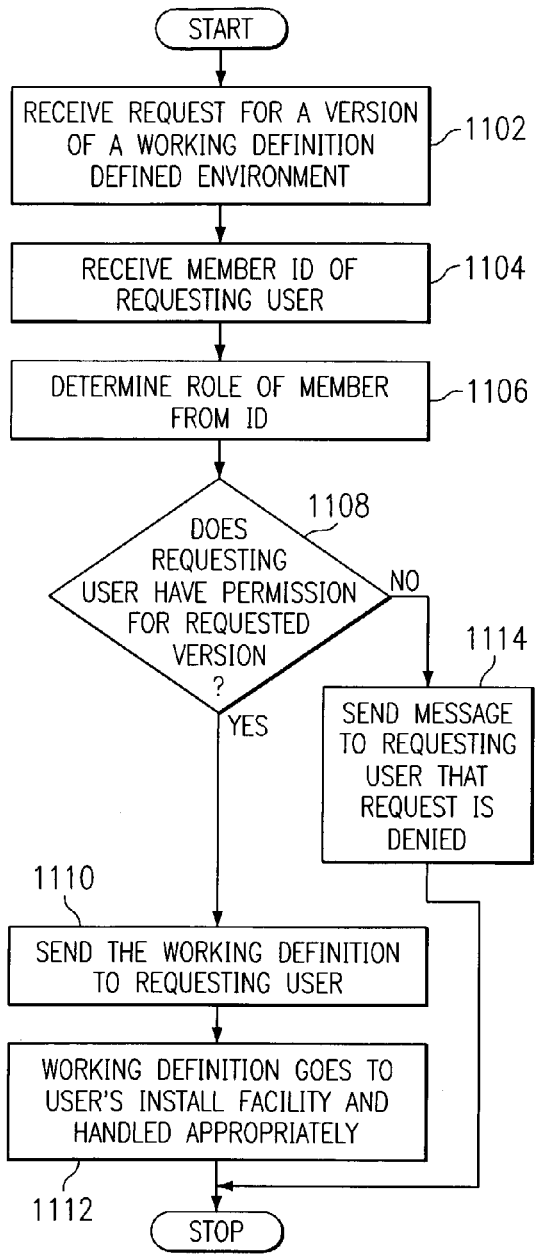
FIG. 11 depicts a flowchart illustrating an exemplary method of providing working definition defined environments to clients for software development purposed in accordance with a preferred embodiment of the present invention.

With reference now to FIG. 11, a flowchart illustrating an exemplary method of providing working definition defined environments to clients for software development purposes is depicted in accordance with a preferred embodiment of the present invention. The application development server, such as, for example, application development server 1002 in FIG. 10, receives, from a client, such as for example, client 1004 in FIG. 10, a request for a particular version of a working definition defined environment (step 1102). The application development server also receives a member identification from the requesting user (step 1104). Steps 1102 and 1104 may be performed in reverse order or simultaneously and may have other processes intervening between execution of each step.

The application server uses the member ID to determine which working definition defined environment the requesting user has privileges to access based on the role or roles assigned that member (step 1106). The application development server may keep a database of member IDs and corresponding roles that each member holds as well as a database of services and versions of environments that a particular member or role has privilege to access and use.

The application development server then determines whether the requesting user is entitled to access and use the requested environment (step 1108). If the requesting user is not entitled to access, then a message that the request is denied is sent to the user (step 1114) and the process ends. If the use is entitled to access and use the requested version of the runtime environment, then the requested working definition is sent to the requesting user (step 1110). The working definition is then sent to the installer on the user's data processing system and is handled appropriately (step 1112), at which point the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An application development server, comprising:
a storage unit for storing a plurality of working definitions for a plurality of computing environments;
an interface for receiving requests for one of the plurality of computing environments from and transferring the requested one of the plurality of computing environments to a client over a communications line;
each one of said plurality of computing environments including a set of first working definitions that define a plurality of applications and a second working definition that defines said each one of said plurality of computing environments, said set of first working definitions and said second working definition being included in said plurality of working definitions;
each one of said set of first working definitions including platform independent definitions that define characteristics of one of said plurality of applications that are necessary to construct a valid runtime image of said one of said plurality of applications, said characteristics including state, settings, and structures required to build said runtime image of said one of said plurality of applications; and
said second working definition including platform independent definitions that define characteristics of said each one of said plurality of computing environments that are necessary to construct a valid runtime image of said each one of said plurality of computing environments, said characteristics including state, settings, and structures required to build said runtime image of said each one of said plurality of computing environments.

2. The application development server as recited in claim 1, wherein the communication line is the Internet.

3. The application development server as recited in claim 1, wherein each one of said set of first working definitions includes source code for one of said plurality of applications defined by said one of said set of first working definitions.

4. The application development server as recited in claim 1, wherein encrypted links are sent to the client along with the requested one of the plurality of computing environments, the encrypted links providing support for development, testing, beta testing, and deployment of the plurality of applications.

5. The application development server as recited in claim 1, wherein the communications line is an intranet.

6. The application development server as recited in claim 1, further comprising:
   said interface receiving an update to one of said set of first working definitions; and
   said one of said set of first working definitions being modified to reflect said update.

7. The application development server as recited in claim 1, further comprising:
   a change occurring within a data processing system;
   responsive to a determination that the change affects one of said set of first working definitions, the one of said set of first working definitions being modified to reflect the change; and
   the runtime image of one of said plurality of applications defined by said one of said set of first working definitions being updated.

8. The application development server as recited in claim 7, wherein the change is an event.

9. A computer program product encoded on a computer readable recordable-type medium, comprising:
   computer executable instruction means for storing a plurality of working definitions for a plurality of computing environments;
   computer executable instruction means for receiving requests for one of the plurality of computing environments from and transferring the requested one of the plurality of computing environments to a client over a communications line;
   each one of said plurality of computing environments including a set of first working definitions that define a plurality of applications and a second working definition that defines said each one of said plurality of computing environments, said set of first working definitions and said second working definition being included in said plurality of working definitions;
   each one of said set of first working definitions including platform independent definitions that define characteristics of one of said plurality of applications that are necessary to construct a valid runtime image of said one of said plurality of applications, said characteristics including state, settings, and structures required to build said runtime image of said one of said plurality of applications; and
   said second working definition including platform independent definitions that define characteristics of said each one of said plurality of computing environments that are necessary to construct a valid runtime image of said each one of said plurality of computing environments, said characteristics including state, settings, and structures required to build said runtime image of said each one of said plurality of computing environments.

10. The product as recited in claim 9, wherein each one of said set of first working definitions includes source code for one of said plurality of applications defined by said one of said set of first working definitions.

11. The product as recited in claim 9, further comprising instruction means for sending encrypted links to the client along with the requested one of the plurality of computing environments, the encrypted links providing support for development, testing, beta testing, and deployment of the plurality of applications.

12. The product as recited in claim 9, further comprising:
   instruction means for receiving an update to one of said set of first working definitions; and
   instruction means for modifying said one of said set of first working definitions to reflect said update.

13. The product as recited in claim 9, further comprising:
   instruction means for detecting a change within a data processing system;
   responsive to a determination that the change affects one of said set of first working definitions, instruction means for modifying the one of said set of first working definitions to reflect the change; and
   instruction means for updating the runtime image of one of said plurality of applications defined by said one of said set of first working definitions.

14. A method for providing automated software development to a client, said method comprising:
   storing a plurality of working definitions for a plurality of computing environments;
   receiving requests for one of the plurality of computing environments from and transferring the requested one of the plurality of computing environments to a client over a communications line;
   each one of said plurality of computing environments including a set of first working definitions that define a plurality of applications and a second working definition that defines said each one of said plurality of computing environments, said set of first working definitions and said second working definition being included in said plurality of working definitions;
   each one of said set of first working definitions including platform independent definitions that define characteristics of one of said plurality of applications that are necessary to construct a valid runtime image of said one of said plurality of applications, said characteristics including state, settings, and structures required to build said runtime image of said one of said plurality of applications; and
   said second working definition including platform independent definitions that define characteristics of said each one of said plurality of computing environments that are necessary to construct a valid runtime image of said each one of said plurality of computing environments, said characteristics including state, settings, and structures required to build said runtime image of said each one of said plurality of computing environments.

15. The method as recited in claim 14, wherein each one of said set of first working definitions includes source code for one of said plurality of applications defined by said one of said set of first working definitions.

16. The method as recited in claim 15, further comprising sending encrypted links to the client along with the requested one of the plurality of computing environments, the encrypted links providing support for development, testing, beta testing, and deployment of the plurality of applications.

17. The method as recited in claim 15, further comprising:
   receiving an update to one of said set of first working definitions; and
   modifying said one of said set of first working definitions to reflect said update.

18. The method as recited in claim 15, further comprising:
   detecting a change within a data processing system;
   responsive to a determination that the change affects one of said set of first working definitions, modifying the one of said set of first working definitions to reflect the change; and
   updating the runtime image of one of said plurality of applications defined by said one of said set of first working definitions.

19. The method as recited in claim 18, wherein the change is an event.

* * * * *